E. A. & H. KRAMER.
J. D. KRAMER, EXECUTOR OF H. KRAMER, DEC'D.
ANIMAL RELEASING DEVICE.
APPLICATION FILED MAR. 10, 1917.
1,270,173.
Patented June 18, 1918.
2 SHEETS—SHEET 2.
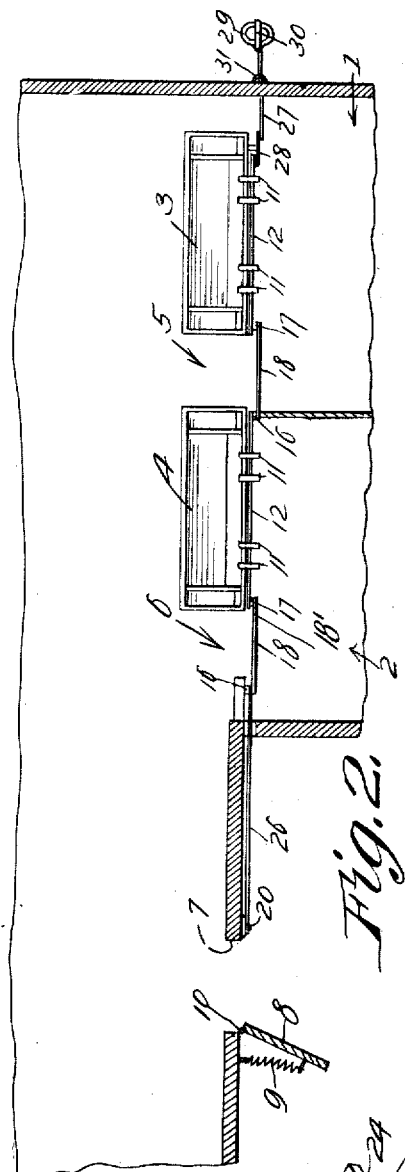
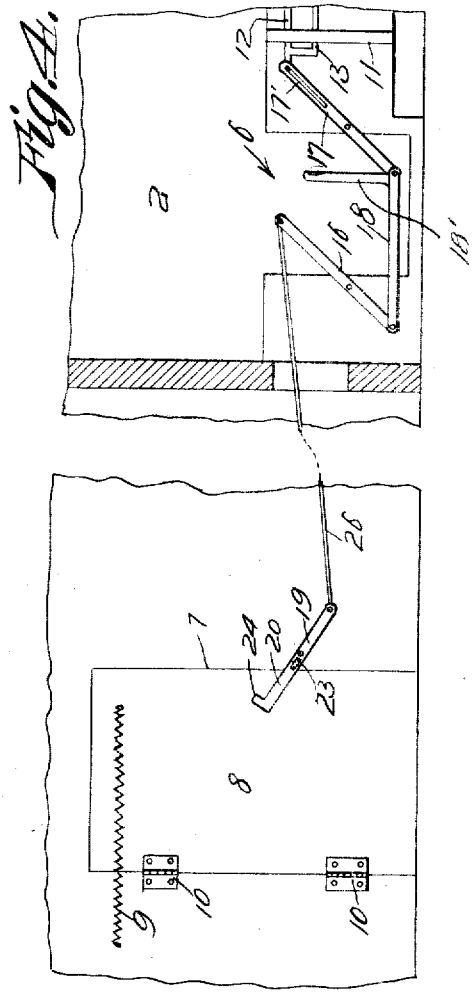
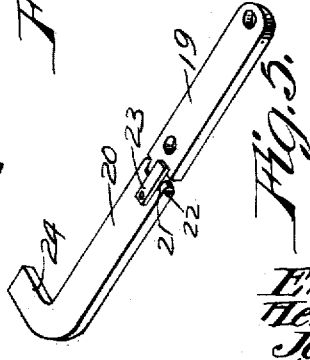
Inventors
Ernest A. Kramer and
Henry Kramer, dec'd.
John Kramer, Extr.
By Talbert & Parker
Attorneys

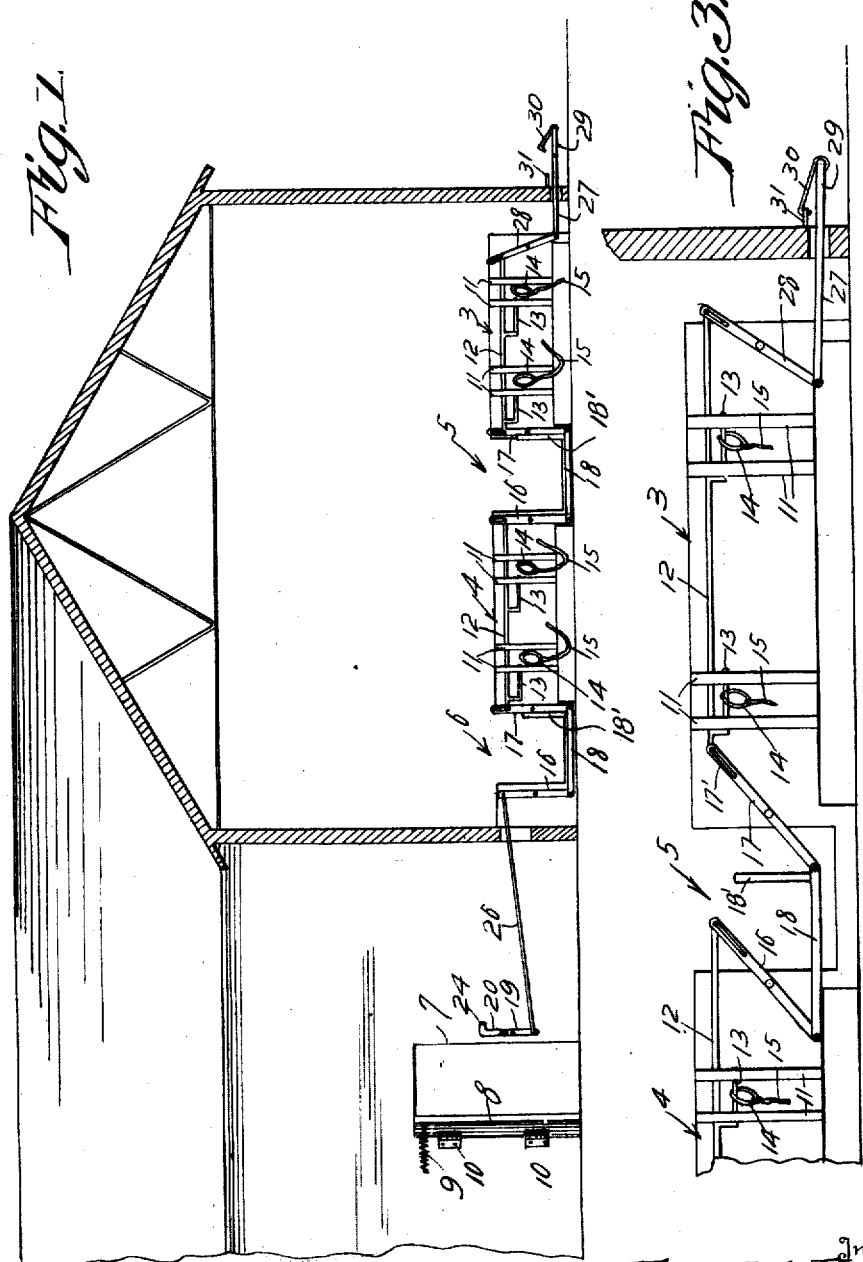

UNITED STATES PATENT OFFICE.

ERNEST A. KRAMER, OF GRANT PARK, AND HENRY KRAMER, DECEASED, LATE OF GRANT PARK, ILLINOIS, BY JOHN D. KRAMER, EXECUTOR, OF GRANT PARK, ILLINOIS, ASSIGNORS OF ONE-SIXTH TO ERNEST A. KRAMER, ONE-SIXTH TO JOHN D. KRAMER, AND ONE-SIXTH TO MARGUERITE KRAMER, ALL OF GRANT PARK, ILLINOIS, ONE-SIXTH TO HENRY KRAMER, JR., OF CRETE, ILLINOIS, ONE-SIXTH TO DOROTHY A. KRAMER, OF CHICAGO, ILLINOIS, AND ONE-SIXTH TO FRED W. KRAMER, OF KINGDOM, CALIFORNIA.

ANIMAL-RELEASING DEVICE.

1,270,173.  Specification of Letters Patent.  Patented June 18, 1918.

Application filed March 10, 1917. Serial No. 153,976.

*To all whom it may concern:*

Be it known that ERNEST A. KRAMER, a citizen of the United States, residing at Grant Park, in the county of Kankakee and State of Illinois, and HENRY KRAMER, deceased, late a citizen of the United States and resident of Grant Park, in the county of Kankakee and State of Illinois, have invented new and useful Improvements in Animal-Releasing Devices, of which the following is a specification, reference being had therein to the accompanying drawing.

The present invention has reference generally to that class of inventions known as animal husbandry and more particularly relates to a device for releasing animals from a barn.

As the primary aim and object the present invention contemplates the provision of novel means for releasing animals from the troughs to which they are connected in the barn, opening the passage ways between the troughs and releasing the door of the barn permitting the animals to leave the stalls and pass through the door opening in the barn, unitary means being provided for effecting the operation of the device, thereby providing a labor saving device and at the same time providing a device that is especially adapted for use in the event the barn be afire, since the animals may be readily and quickly released and possibly be able to make their escape.

More particularly, the present invention contemplates the provison of improved means for releasing the halter strap connected to the animals in the stall.

It is an additional and equally important object of the present invention to provide movable gate frames which are operably associated with the halter releasing means and which serve to removably close the passage ways between the doors.

Still further, the invention consists in the provision of a door or gate latch pivotally mounted on the portion adjacent the door for normally holding the door in a closed position and operably connected to the adjacent movable gate frame so as to be operated simultaneously with the operation of the gate frame and the halter releasing means.

A more specific object of the present invention consists in the provision of means for latching the operating means to prevent accidental operation of any of the parts; to also construct the door latch in sections so that it may be manually connected to release the door without operating the other parts; and to also provide a spring mounted door so that it will automatically swing outwardly subsequent to being closed.

Among the other aims and objects of the present invention may be recited the provision of a device of the character mentioned with a view to compactness, and in which the number of parts are few, the construction simple, the efficiency high, and the cost of production low.

Other objects, as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a front elevation of the entire invention in an open position.

Fig. 2 is a top plan thereof, the portion being shown in sections.

Fig. 3 is an enlarged elevation of the halter releasing means and the adjacent movable gate frame parts being shown in a locked position.

Fig. 4 is an enlarged side elevational detail of the door latch and the adjacent movable gate frame.

Fig. 5 is a perspective detail of the door latch.

Similar characters of reference are employed in all of the above described views, to indicate corresponding parts.

Referring now, more particularly, to the accompanying drawings we have illustrated a barn having stalls 1 and 2 therein at the front ends of which are troughs 3 and 4 having passage ways 5 and 6 therebetween. The barn is also provided with a door opening 7 which is closed by a door 8 pivotally and resiliently mounted to one side of the door opening so that its normal tendency is to swing outwardly automatically upon release. This is accomplished by employing coil springs 9 in conjunction with the hinges 10, one end of each coil spring being connected to the door and the other end to the barn.

With a view toward providing our improved halter releasing means hereinbefore mentioned, we have mounted a pair of spaced brackets 11 on the front of the troughs 3 and 4 and have slidably mounted a rod 12 in openings in the brackets. Hooks 13 are formed integral with the rod and arranged in spaced relation with each other being adapted to engage openings in the brackets when operated so as to retain rings 14 therein, said rings being connected to the halter straps 15 adapted to be arranged on the animals in the stalls 1 and 2.

With a view toward providing the improved movable gate frame we have pivotally mounted bars 16 and 17 intermediate their ends upon opposite sides of the passage ways 5 and 6 while connecting bars 18 have their respective ends pivotally connected to the lower ends of the bars 16 and 17. An upright guard 18' is formed integrally with each bar 18 adjacent the pivot point of the adjacent bar 17. The upper end of the bar 17 of the gate frame 5 is provided with a slot 17' and is connected for pivotal and sliding movement to the adjacent end of the adjacent rod 12 while the bar 16 at this passage way is pivotally connected to the adjacent end of the other rod 12. As is apparent from this arrangement when one of the rods 12 is actuated the gate frame at the passage way 4 and the other rod 12 will be actuated simultaneously therewith. In order to simultaneously actuate the other gate frame at the passage way 6 the upper end of the bar 17 is pivoted to the adjacent end of the adjacent rod 12.

As intimated, there is provided a gate latch formed in sections 19 and 20 the adjacent ends of which are provided with ears 21 and pivotally connected to each other through the medium of a pintle 22. A latch bar 23 is pivoted to the section 20 and is normally adapted to be arranged over the pivotal connection to prevent relative swinging movement of the sections for a purpose that will presently appear. The outer end of the section 20 is bent at right angles to provide a lug 24 and the section 19 is provided with an opening for the reception of a suitable fastening device to permit of the pivoting of the latch member to the outer side of the barn adjacent the door 8 while the latch is connected to the upper end of the bar 16 at the passage way so as to be moved simultaneously therewith through the medium of a connecting rod 26 the respective ends of which are pivoted to the upper end of the side bar 15 and to the lower end of the section 19 of the latch.

With a view toward providing the improved unitary means for actuating all of the parts simultaneously so that they will assume the position illustrated in Fig. 1 we have slidably mounted an actuating rod 27 in an opening in the side of the barn, the inner end of the said member being arranged in pivotal engagement with the lower end of a bar 28 pivoted intermediate its ends to the front face of the adjacent trough while the upper end is in turn pivoted to the adjacent end of the rod 12. A hand engaging loop 29 is formed on the outer projecting end of the actuating bar 27 and as is readily apparent when this rod 27 is moved to the position shown in Fig. 1 all of the parts will assume such position to consequently release animals from the stalls and allow them to pass through the passage ways and finally through the barn door opening. A catch 30 is pivoted to the outer end of the loop and a hooked end thereof is adapted for removable engagement with an eye 31.

The operation of the present invention may be reviewed as follows: Assuming that the rings 14 on the halter straps 15 which are adapted to be connected to animals in the stalls 1 and 2 are retained between the pairs of brackets 11 by the hooks 13 and that the movable gate frames are arranged so that the bars 17 and 18 thereof are arranged in a closed position at the passage ways as indicated in Fig. 1 and that the door 8 is held in a closed position by the latch. In order to operate all of these devices simultaneously the hooked end of the catch 30 is removed from the eye 31 and the bar 27 is pulled upwardly so as to move the bar 28 about its pivot and simultaneously move both of the halter releasing bars toward the adjacent passage ways so that the hooks will release the rings 14 while the bars 16, 17, and 18 of the movable gate frames will be arranged in spaced relation respectively to the sides and bottom of the passage ways 5 and 6 as indicated in Fig. 1 and also the gate latch will be swung about a pivot simultaneously therewith and permit the spring actuated door to open automatically upon release. This permits the animals within the stalls to pass through the passage ways 5 and 6 and also through the door openings 7. If the parts are in the locked position as indicated in Fig. 3 and the attendant desires to enter the bar without actuating all of the parts the latch bar 23 may be moved transversely of the section 20 of the gate latch to permit of the section 20 being swung away from the door and on the pivot point 22 to permit of the door to be opened.

It will be understood that the above description and accompanying drawings comprehend only the general and preferred embodiment of our invention and that various minor changes in detail of construction, proportion and arrangement of the parts may be made within the scope of the appended claims and without sacrificing any of the advantages of our invention.

Having thus fully described our invention, what we claim as new and desire to secure by Letters-Patent, is:—

1. In a device of the character described, the combination with halter retaining means and a movably mounted door of a latch formed in a pair of pivotally connected sections, a latch bar pivoted to one section to maintain the other section in an extended form, one of the sections being pivotally mounted adjacent the door so as to normally hold the door in a closed position and also operably connected to the halter retaining means, unitary actuating means for releasing the latch and the halter retaining means simultaneously, and the latch bar being operable at times to permit the free section of the latch to be folded against the other section and consequently permit the door to be opened and leave the halter retaining means unmoved.

2. In a device of the character described, in combination with an automatically operating door, and halter retaining means adapted to be movably mounted on troughs, gate frames each embodying movably connected sections adapted to be mounted at the passage ways between the troughs for normally closing the passage ways and operably connected to the halter retaining means so as to be moved into an open position simultaneously with the actuation of the halter retaining means, a pivotally mounted door latch for normally holding the door in a closed position and operably connected to the adjacent movable gate so as to be actuated simultaneously therewith, and unitary means for actuating all of the parts simultaneously.

3. A device of the character described, in combination with an automatically operating door, halter retaining means adapted to be movably mounted on troughs, movable sectional gate frames each embodying spaced bars pivotally mounted intermediate their ends and adapted to be positioned at opposite sides of the passageways between the troughs, a connecting bar having the respective ends pivoted to the lower ends of the spaced bars, an upright guard on each connecting rod, means for movably connecting the upper ends of the spaced bars to the adjacent halter retaining means so that the gate frames will be positioned to normally close the passageways and will be moved into an open position simultaneously with the actuation of the halter retaining means, and unitary means for actuating the parts simultaneously.

4. A device of the character described, in combination with an automatically swinging door, halter retaining means adapted to be movably mounted on troughs, movable sectional gate frames each embodying spaced bars pivotally mounted intermediate their ends and adapted to be positioned on opposite sides of the passage ways between the troughs, a connecting bar having the respective ends pivoted to the lower end of the spaced bars, an upright guard on each connecting rod, means for movably connecting the upper ends of the spaced bars to the adjacent halter retaining means so that the gate frames will be positioned to normally close the passage ways and will be moved into an open position simultaneously with the actuation of the halter retaining means, a pivotally mounted door latch for normally holding the door in a closed position and operably connected to the adjacent bar of the adjacent gate frame so as to be actuated simultaneously therewith, and unitary means operably connected to the halter retaining means for actuating all of the parts simultaneously.

In testimony whereof we affix our signatures.

ERNEST A. KRAMER.
JOHN D. KRAMER,
*Executor of Henry Kramer, deceased.*